C. CAMPUS.
MACHINE FOR MAKING MATCH CARDS.
APPLICATION FILED MAR. 20, 1913.

1,073,393.

Patented Sept. 16, 1913.

WITNESSES
Chas. J. Clagett
Bertha M. Allen.

INVENTOR
Cesare Campus
BY
his ATTORNEYS

C. CAMPUS.
MACHINE FOR MAKING MATCH CARDS.
APPLICATION FILED MAR. 20, 1913.

1,073,393.

Patented Sept. 16, 1913.

Witnesses:
Chas. F. Clagett
Bertha M. Allen.

Inventor
Cesare Campus
By his Attorney

C. CAMPUS.
MACHINE FOR MAKING MATCH CARDS.
APPLICATION FILED MAR. 20, 1913.

1,073,393.

Patented Sept. 16, 1913.
6 SHEETS—SHEET 6.

UNITED STATES PATENT OFFICE.

CESARE CAMPUS, OF NEW YORK, N. Y.

MACHINE FOR MAKING MATCH-CARDS.

1,073,393.   Specification of Letters Patent.   Patented Sept. 16, 1913.

Application filed March 20, 1913. Serial No. 755,635.

*To all whom it may concern:*

Be it known that I, CESARE CAMPUS, a subject of the King of Italy, residing in the borough of Manhattan, city, county, and State of New York, have invented an Improvement in Machines for Making Match-Cards, of which the following is a specification.

My present invention relates to a machine for making match cards of the form shown and described in Letters Patent No. 1,055,875 granted to me the 11th day of March, 1913, for an improved match card.

The object of this invention is therefore the provision of a machine for making a match card consisting of a continuous strip having a plurality of succeeding groups of matches thereon, each of these groups being spaced from adjacent groups a distance greater than that between the adjacent matches of each group; the said strip being adapted to be cut between the match groups so as to form units having shoulders at their sides.

In carrying out my invention, I preferably employ a reciprocating head carrying a plurality of punches and a fixed base in which there are a plurality of dies coöperating with the said punches. The stock from which the match cards are formed, is preferably fed, step by step, through the machine by any suitable intermittent movement, which latter, however, forms no part of my present invention.

As the stock is progressively fed through the machine, slots are formed in one part thereof to provide the spaced groups of matches and the shoulders at the base of the cards, and in another portion of the stock the same is cut transversely of its length and also to the direction in which it is fed to form the match card blank in which the match splints are then formed, and at the same time the match card is bent along the line at the base of the match splints to rupture the fiber so that the use of a scoring device is eliminated. I also employ devices for ejecting the match splints from the dies, which devices are yieldingly mounted in the apparatus and co-act with the punches to maintain the parts of the blank, from which the match splints are formed, in a fixed position, so long as the splints are within the dies, in order that the material may not be injured and that the splints may have a uniform size and appearance. I also employ devices for maintaining the stock and the match card blank in position while the punches are being withdrawn from the dies, in order to further insure the stock from being injured in the formation of the match card. Furthermore, I may also employ punches and dies for making slots in the stock which are so placed therein that when the match card blanks are cut from the stock, the edge of the blank is provided with notches by means of which the match cards may be secured in position in an improved machine for making match books therefrom, which match book making machine forms the subject-matter of a separate application. In order that the match cards, as made by the machine described herein, may be of a uniform length, I may also employ suitable cutting devices for trimming the shoulders at the ends of the match cards, all of which will be hereinafter more particularly described.

In the drawing, 20 designates the bed of the machine, which may be suitably mounted on any kind of foundation. Fixed on the bed 20, is a die block 21.

22 designates a reciprocating head, to which is suitably connected a punch block 23. In bearings 24, suitably supported from the head of the machine, is a crank shaft 25, between the crank arms of which is connected a rod 27. The connecting rod 27 is provided with a head 28, fitting within a recess 29 provided therefor in the reciprocating head 22, and is secured in position therein by a suitable pin 30 or otherwise. Secured on one end of the crank shaft 25, I have illustrated a pulley 31, by means of which suitable power may be applied to drive the shaft 25 to reciprocate the head 22 and punch block 23. Suitably connected on the head 22 is a printing block 32. This printing block 32 is adapted to receive a printing frame 33, in which may be fixed a printing form 34, the printing frame being secured in position in the block 32 by means of a set screw 35 or otherwise. In the die block 21, immediately beneath the form 34, I employ a blanket 36, preferably made of rubber or other similar resilient material, against which the printing form forces the stock strip and the impression from the type is made thereon.

On the under side of the reciprocating head 22, is a punch plate 37, in which there is a series of spaced punches indicated at 38. In this punch plate, I also employ punches, indicated at 39, and as hereinafter described the punches 38 are adapted to coöperate with the dies to form spaced recesses in the stock strip to provide for the spaced groups of matches when the match card is complete, and the punches 39 to provide for the notches in the edge of the match card.

In the die block 21, immediately beneath the punch plate 37 and its series of punches 38 and 39, is a die plate 40 provided with a series of spaced apertures adapted to receive the punches 38. In this die plate 40, there are also a series of apertures 42, each adapted to receive one of the punches 39. In the die plate 21, beneath the die block 40, there is an opening 43, and beneath the opening 43, in the bed 20, there is an opening 44, providing for the removal of those portions of the stock strip which are cut therefrom by the punches 38 and 39 in their coöperation with the die plate 40, it being understood that these portions of the stock, as punched from the strip, will drop through these openings 43 and 44 and then be readily removed from beneath the machine.

Figure 1:
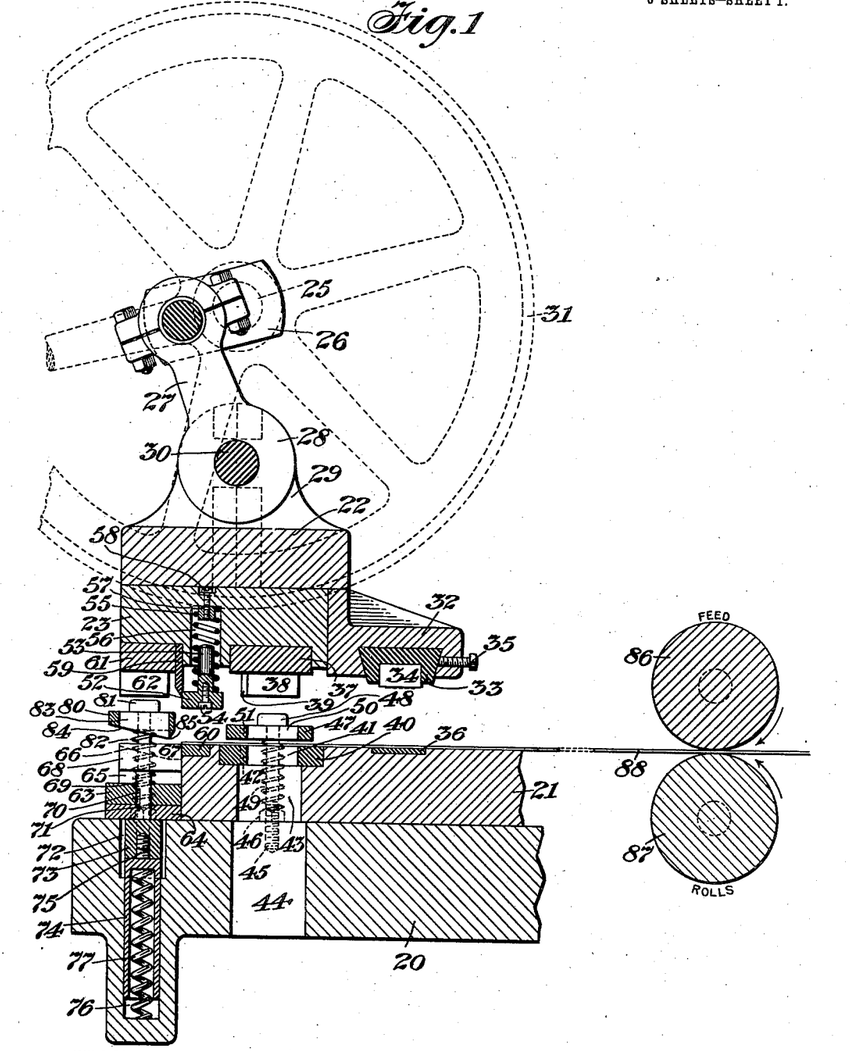
Figure 1 is a partial longitudinal section of my improved match card making machine, taken on lines $a$ $a$, Fig. 2.
Figure 2:
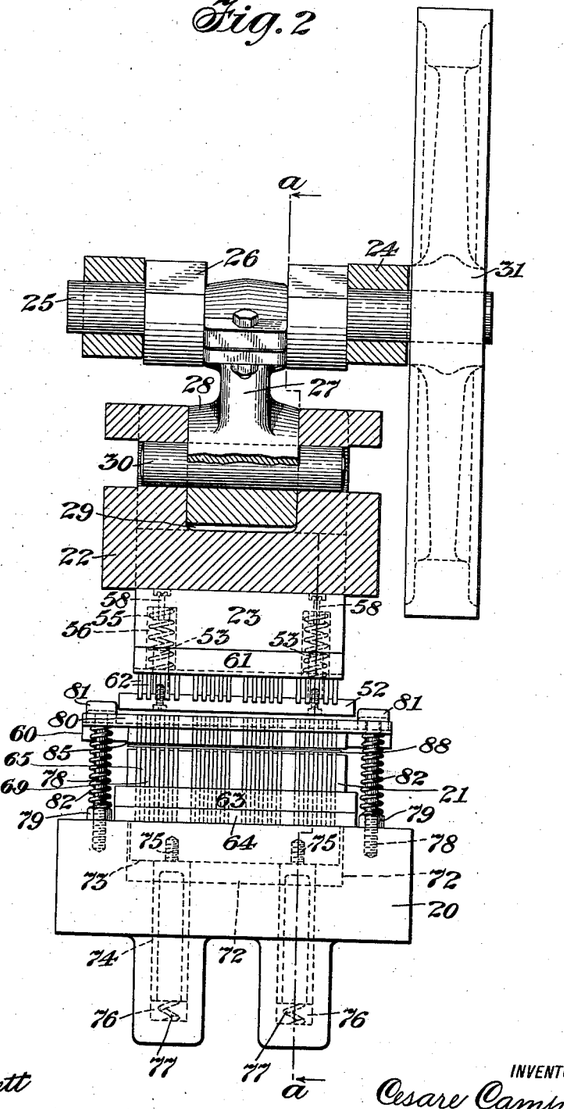
Fig. 2 is a front elevation and partial section, the views shown in Figs. 1 and 2 illustrating the parts in their partially open positions.
Figure 3:
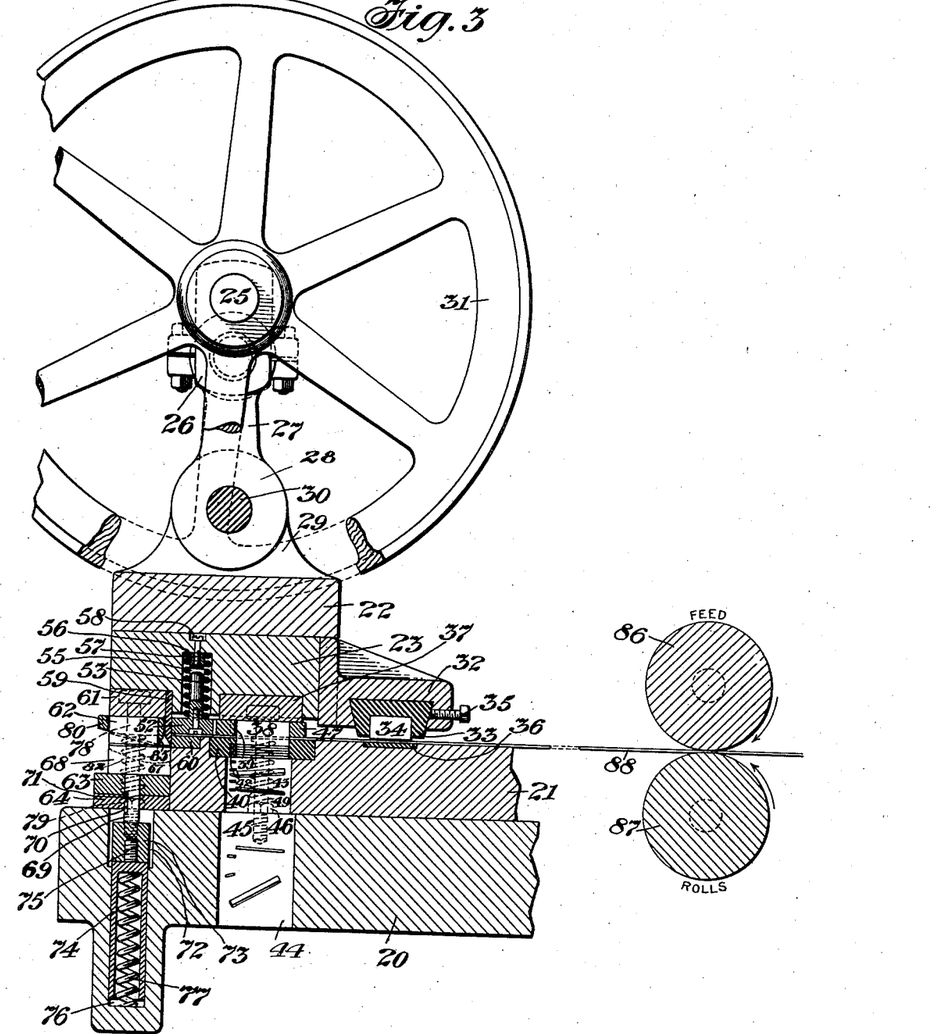
Fig. 3 and Fig. 4 are views similar to Figs. 1 and 2, respectively, showing the parts in their closed positions.
Figure 4:
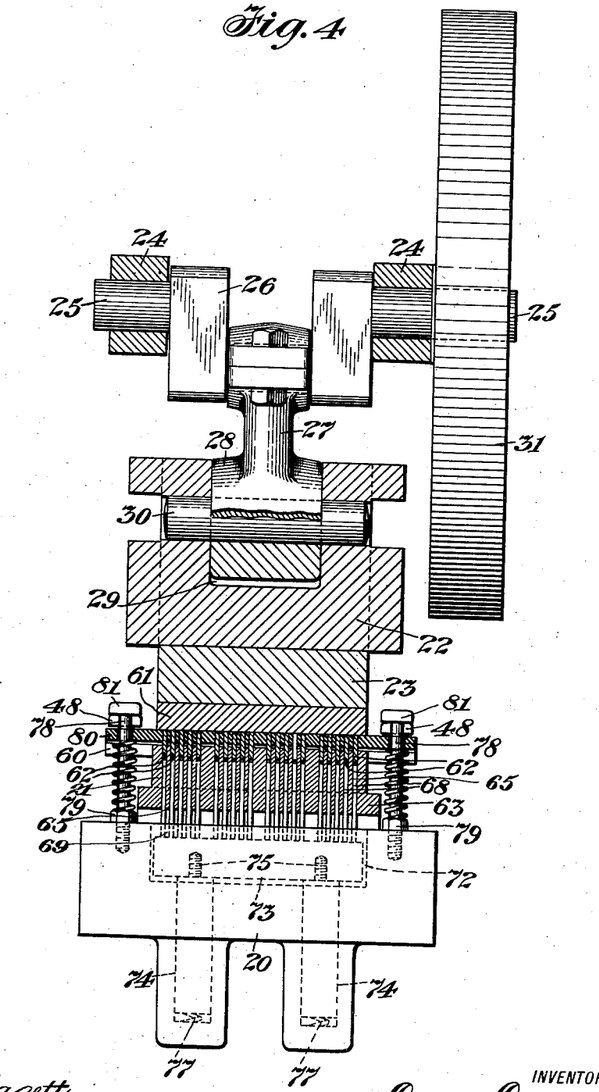

In the bed 20, at the respective ends of the die plate 40, stud bolts 45 are placed and secured in position by lock nuts 46 or otherwise. Slidably mounted on these stud bolts 45 is a stripper plate 47, adapted to normally maintain against the heads 48 of the stud bolts 45, by means of springs 49 which surround the said bolts and extend from the lock nuts 46 to the under surface of the stripper plate 47. This stripper plate 47 is provided with a series of apertures 50, corresponding in size, number and position to the apertures 41 in the die plate 40, so that these apertures 50 register with the apertures 41, and as plainly indicated in Fig. 1, the normal position of the stripper plate 47 is sufficiently above the die plate 40 to permit the free passage of the stock strip between the same. In this stripper plate 47, there are also provided series of apertures which correspond in number, size and position with the apertures 42 in the die plate, the apertures 51 being so placed in this stripper plate as to register with the apertures 42 in the die plate in the same manner that the apertures 50 and 41 register with one another.

Forward of the punch block 37, I employ a presser bar 52. At its respective ends, this presser bar is connected to plungers 53, by means of the screws 54 or otherwise, and each plunger 53 is adapted to operate in the recess 56, provided therefor in the punch block 23. At the base of each recess is the block 57, which is secured in position therein by a screw 58. Within each recess 56 is a spring 55, which at one end is connected to the block 57, and at the opposite end contacts with the upper surface of the presser bar 52, to normally maintain the same in the position shown in Fig. 1.

Forward of the presser bar 52, and secured in a suitable manner in the punch block 23, there is a knife 59, and set in the forward edge of the die block 21 is a block indicated at 60. The forward edges of the presser bar 52 and the block 60 are in alinement, and the knife 59, which extends across the die block, is so placed as to bear against the forward faces of the presser bars 52 and the block 60, so that when the presser bar, through the reciprocating movement of the head and punch block, is brought into contact with the block 60, these parts hold the stock between them and act as a press to hold the paper or stock while the same is being cut by the knife 59.

Fixed in the punch block 21, forward of the knife 59, is a punch plate 61, in which there is a series of punches, indicated at 62. These punches 62 are arranged in groups with intervening spaces to provide for the spaced groups of match splints in the card. Upon the bed 20, and immediately forward of the die block 21, and beneath the punch plate 61 and punches 62, is a die plate 63. This die plate 63 is preferably supported upon a spacing plate 64 which rests directly upon the base or bed 20. In the die plate 63, there are series of spaced projections or die blocks 65, with intervening recesses, the spaced projections 65 being so arranged that the spaces between them correspond with the punches 62. The upper surface of each projection 65 is inclined inwardly, as indicated at 66, to a point indicated at 67, which is equal to the length of the match splint when cut in the card, and from this point 67 to the inner edge thereof, the upper surface of these projections is parallel with the base of the die block.

In the space intervening between each of the projections 65, I employ an ejector 68, from the body portion of each of which a tongue 69 depends and passes into and through an aperture provided therefor in the die plate 63 and the spacing plate 64, each tongue 69, preferably in its outer edge, being provided with a recess 70, into which a lug 71, on the spacing plate, extends to limit the movement of the ejector.

Beneath the spacing plate 64, in the bed 20, there is a transverse recess 72. Within this recess is a bar 73, to the opposite ends of which plungers 74 are connected by means of screws 75 or otherwise. These plungers 74 operate in recesses 76, provided therefor in the bed 20, and are normally held in such positions as to maintain the bar 73 against the ends of the tongue 69 of the ejector 68. This may be done by means of the springs 77, each of which extends from the base of one of the recesses 76 through a bore provided therefor in one of the plungers. At the ends of the die block 63, a second pair of stud bolts 78 is secured in the base 20 and locked therein by lock nuts 79 or otherwise. Slidably mounted on these stud bolts 78 is a second stripper plate 80. The plate 80 may be normally maintained in position against the heads 81 of the said bolts 78 by means of springs 82 which surround the stud bolts 78 and extend from the lock nuts 79 to the under surface of the stripper plate 80. This stripper plate 80 is provided with series of openings 83 of the same size and in the same positions as the recesses between the projections 65 in the die plate, and the under surface of this stripper plate 80 is preferably inclined, as indicated at 84, this inclination being at the same angle as is the inclination of the upper surfaces of the projection 65. At its lower inner edge, this stripper plate may be tapered to a line, as indicated at 85, for the purpose hereinafter indicated, although it will be understood this is not essential.

86 and 87 represent diagrammatically a pair of feed rolls, by which the paper or other stock 88 from a suitable reel is intermittently fed to and through the hereinbefore described machine.

Figures 11, 12, 13:
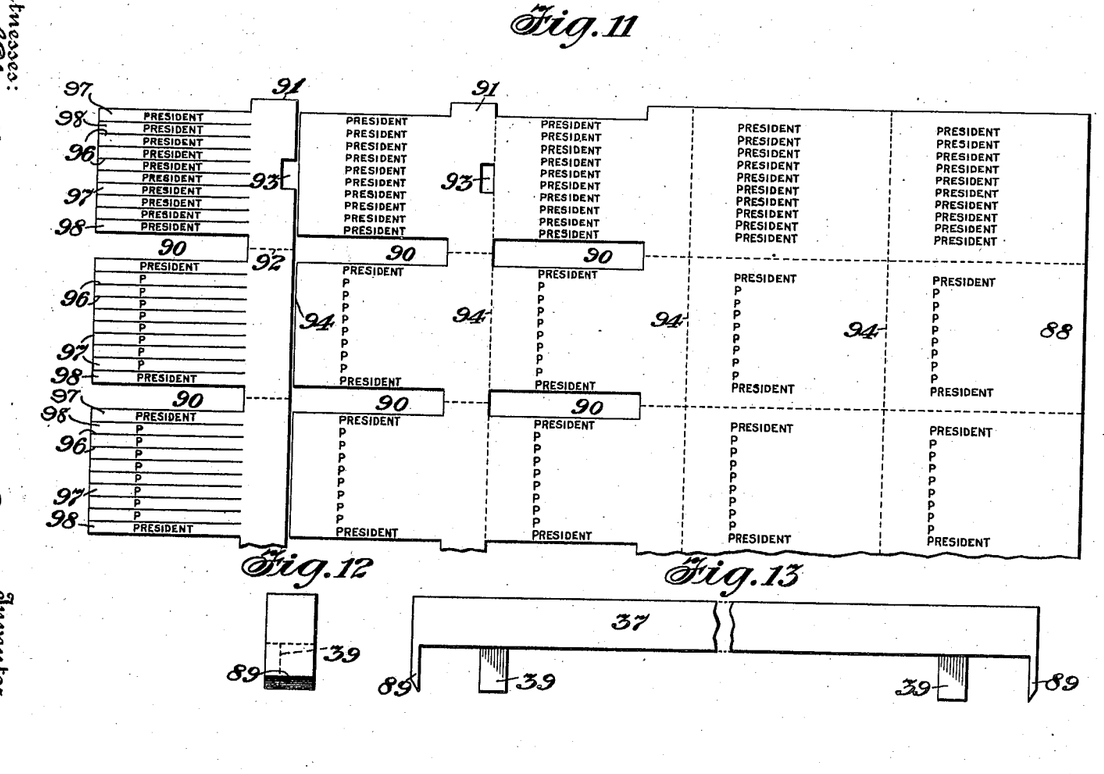
Fig. 11 is a partial plan of the stock strip from which the match cards are formed, illustrating the various steps in the formation thereof.
Fig. 12 is a partial end elevation, illustrating one of the knives by which the ends of the match card are trimmed to make the same of uniform length.
Fig. 13 is a front elevation of one of these trimmer knives.

Referring to Figs. 12 and 13, I may also employ, suitably secured to the punch block 23 adjacent to the ends of the punch plate 37, knives indicated at 89. These knives, as will be hereinafter explained, are employed for the purpose of trimming the shoulders formed at the base of the match card, in order to make the same of uniform lengths.

Referring to Fig. 11, the slots made in the paper stock by the punches 38 and the die block 40 are represented at 90. These slots provide the blank with spaced portions, in which the match splints are formed, and also provide for the shoulders 91 at the ends of each individual match card when the match card strip is severed on the lines 92 in the machine for making the match books. The slots formed in the stock by the punches 39 and their corresponding dies, are represented at 93, and when the stock has been severed along the line 94 through the forward end of the slots 90 and the rear side of the slots 93 when the stock is cut by the knife 59, these slots 93 become notches in the edge of the match card, which are engaged by suitable lugs on the feeding mechanism in the machine for making the book matches, and as will be understood, any number of the punches 39 and coöperating dies may be employed to make the required number of the slots and resultant notches 93. After having been severed along the line 94 by the knife 59, to form the match card, the match splints are cut in the spaced portions thereof along the lines 96 by the punches 62 and their coöperating dies, so as to form two rows of match splints, indicated respectively at 97 and 98, the match card being bent at the bases of the match splints so that alternate match splints, as indicated at 98, form one row and the intermediate match splints, as indicated at 97, form the other row, as will be hereinafter more particularly described.

In the operation of the apparatus, the crank shaft is rotated by any suitable power, causing the head and the punches carried thereby to reciprocate vertically, the head 22 moving in suitable guide-ways which may be connected to the base of the machine. As hereinbefore stated, the paper stock upon a reel is fed, step by step, by any suitable intermittent movement imparted to the feed rolls 86 and 87. Each time the head 22, with its punches, is reciprocated, the stock in different portions thereof is operated upon so that a match card is formed with each revolution of the crank shaft. In one portion of the paper stock, the parts thereof which are to become the match splints, are printed upon. In Fig. 11 I have shown each match splint as having the word President printed thereon, although, as is manifest, any printed matter may be so placed on these match splints. As shown in Fig. 11, this printing takes place in what I am pleased to call the first step in the formation of the match card. The second step, as indicated in this figure, is a blank step. In the third step, the punches 38 and 39, with their coöperating dies, form the slots 90 and 93 in the paper stock. The fourth step is also a blank step, while in the fifth step, the stock is severed transversely along the line 94 by the knife 59 and the punches 62 and their coöperating dies cut the match splints 97 and 98 in the spaced portions of the match card. It is to be noted that in the operation of the punches 38, and their coöperating dies, the punches first pass downwardly through the spaced apertures 50, in the stripper plate 47, as do also the punches through the spaced apertures 51 in the stripper plate 47, and when in its lowermost position, the punch plate 37 contacts with the stripper plate 47 and depresses the same until it contacts with the upper surface of the stock strip 88.

It will be apparent that in the return or upward movement of the punch plate, during which the punches 38 are removed or withdrawn from their coöperating dies, the limit of the movement of the stripper plate will be its return to a normal position, in which the stock may contact against the under surface of the stripper plate and remain there until the punches 38 are entirely removed from their coöperating dies. This, as will be understood, insures the stock from being injured during the removal of the punches from the dies. It will also be understood that in the downward movement of the reciprocating head, the presser bar 52 is brought in contact with the stock strip prior to the time when either set of punches acts, and that in the continued downward movement of the reciprocating head, the knife 59 severs the stock strip from the line 94, producing the match card blank. In the downward movement of the reciprocating head, the punches 62 pass through the openings 83 in the stripper plate 80 and then coact with the corresponding dies to form the match splints. In this operation, the forward edges of the punches 62 are brought into contact with the forward edge of the match card blank at the same time that the rear edge 85 of the stripper plate 80 contacts with the match card blank, and as the punches continue to move downwardly, the spaced portions of the match card blank are simultaneously slit by the punches and their coöperating dies and bent from the position shown diagrammatically in Fig. 8 to that shown in Fig. 9. As the punches 62 descend and shear the match card blank, those portions of the blank between the faces of the punches and the ejectors will be pressed downwardly between these parts and form the series of splints indicated at 97, while the intermediate portions of the match card blank lying against the under surface of the stripper plate 80, and the adjacent surfaces of the spaced projections 65 of the die form the intermediate series of match splints indicated at 98, which, as will be understood, assume the position shown in Fig. 10, when the punching and shearing operation has been completed, it being noted that the series of match splints 97 are in the same line with the base of the card, while the series of match splints 98 is bent upwardly or outwardly from the base. In this operation the tapered edge of the stripper plate co-acting with the punches and projections of the die plate bend the card blank along the line 99, Figs. 9 and 10, and in so doing rupture the stock at the bases of the match splints, making the match splints readily detachable and thus eliminating the use of a scoring device.

Figures 5, 6, 8:
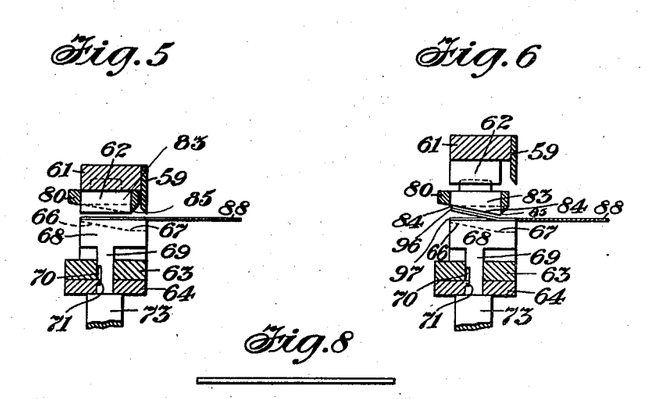
Fig. 5 is a sectional elevation through the knife and match splint forming punches and dies, showing the position of the parts just before the match card blank is severed from the stock strip.
Fig. 6 is a view of the parts shown in Fig. 5, in a position they assume after the match card has been formed, and the splints ejected from the dies.
Figs. 8, 9, and 10 are end elevations of the match card, illustrating the different positions the same is caused to assume in its formation.
Figure 7:
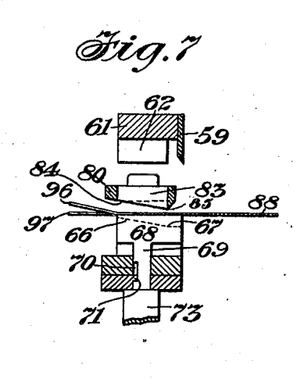
Fig. 7 is a view of the same parts, illustrating the same in their open positions, in which the match card is shown as being ejected from the machine.
Figures 9, 10:
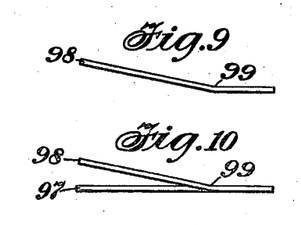

In the return movement of the head, in which the punches 62 are withdrawn from the dies, the ejectors 68 follow the punches as the same are withdrawn, and after the stripper plate has reached its normal position, the series of match splints 98 remain in contact with the under surface thereof until the punches are entirely withdrawn, so that after the match card blanks have been slit to form the match splints therein, the position of the splints, as shown in Fig. 10, is maintained positively while the punches are being withdrawn, and in this form the match cards are ejected from the machine, as clearly indicated in Figs. 6 and 7. It will be understood that it is desirable to maintain this fixed relationship between the series of match splints to facilitate the placing of the heads of combustible material thereon. It will furthermore be noted that the spaces between the projection 65 in the die plate 63 are open at their forward ends, making it possible to readily keep the same clean. Inasmuch as the roll of paper stock from which the card blanks are made may vary slightly in width, and because of the necessity of having the card blanks of absolutely the same length, the knives 89 are employed at the ends of the punch plate 37, and, as will be understood, simultaneously with the action of the punches 38 and 39 and their coöperating dies, the knives 89 will be operated to trim the ends of the card blanks.

I claim as my invention—

1. In a machine for making match cards and in combination, a die plate having series of projections and intervening recesses, series of punches adapted to coöperate with the said projections to form match splints in the match card, and means whereby in the removal of the punches from the recesses between the said projections on the die plate, the match splints are ejected and maintained in the same, and a uniform position as formed in the card by the said die plate and punches.

2. In a machine for making match cards, and in combination, a die plate having a series of projections with intervening recesses, a series of punches coöperating with the said projections to form match splints in the card, a stripper plate, and devices coacting therewith, for maintaining the match splints in a uniform position while the punches are being withdrawn from the spaces between the projections on the die plate.

3. In a machine for making match cards, and in combination, a die plate having a series of projections with intervening recesses, the upper faces of the projections being inclined for a portion of their length, a yieldingly mounted stripper plate having a series of recesses therein corresponding and adapted to register with the recesses between the projections of the die plate, the under surface of the said stripper plate being inclined at the same angle as the inclined portions of the upper faces of the said projections, and a series of punches adapted to coöperate with the said stripper plate and the said projections of the die plate to form match splints in the card.

4. In a machine for making match cards from a strip of paper stock and in combination, means for feeding the strip of paper stock a predetermined distance at stated intervals, means for cutting the strip of paper stock transversely to cut match cards therefrom, a die plate having a series of projections thereon with intervening open ended spaces, a series of punches coacting with the said projections on the die plate to form match splints in each match card, means for actuating the series of punches to cause the same to coöperate with the said die plate, and means whereby in the removal of the punches from the die plate the match splints are ejected and maintained in the same and a uniform position as formed in the card.

5. In a machine for making match cards from a strip of paper stock and in combination, means for feeding the strip of paper stock a predetermined distance at stated intervals, means for cutting the paper stock transversely thereof to form match cards, a die plate having spaced projections with intervening recesses, the upper surfaces of which projections are inclined for a predetermined portion of their length, a series of punches adapted to coöperate with the said projections and intervening recesses, the operating surfaces of the said punches being straight, means for actuating the said cutting means and series of punches, and means whereby in the removal of the punches from the die plate the match splints are ejected and maintained in the same and a uniform position as formed in the card.

6. In a machine for making match cards from a strip of paper stock and in combination, means for feeding the paper stock a predetermined distance at stated intervals, a knife for cutting the paper stock transversely thereof to form match cards therefrom, a die plate having a series of projections and intervening recesses, a series of ejectors in the recesses between the projections on the die plate, a series of punches adapted to coöperate with the said projections and intervening recesses on the die plate, means for mounting the ejectors so that the same are depressed by the said punches as the same enter the recesses between the projections on the die plate and are automatically returned to their normal positions when the punches are withdrawn from the recesses, and means co-acting with the said punches and ejectors whereby as the punches are withdrawn from the recesses between the projections, the match splints are ejected and maintained in the same and a uniform position as formed in the card.

7. In a machine for making match cards from a strip of paper stock and in combination, means for feeding the strip of paper stock a predetermined distance at stated intervals, a knife for cutting the paper stock transversely to form match cards, a die bar having series of projections and intervening recesses therein, a series of punches adapted to coöperate with said projections on the die bar, a yieldingly mounted stripper plate having series of recesses thereon corresponding with the number and position and adapted to register with the recesses between the projections on the die bar, means for actuating the said knife and series of punches, and means coöperating with the said stripper plate and punches, whereby as the punches are removed from the recesses in the die bar, the match splints formed in the card are ejected and maintained in the same and a uniform position as formed in the card by the said die plate and punches.

8. In a machine for making match cards from a strip of paper stock, and in combination, a die plate having a series of projections with intervening recesses, the upper surfaces of which projections are inclined for a portion of their length, a series of punches adapted to coöperate with the said projections and intervening recesses, a stripper plate provided with a series of recesses similar in number and size, and adapted to register with the recesses between the projections of the die plate, the under surface of the said stripper plate being inclined at the same angle as the inclination of the upper surfaces of the said projections of the die plate, a knife for cutting the paper stock transversely thereof, and means for actuating the said knife and series of punches.

9. In a machine for making match cards from a strip of paper stock, and in combination, a die plate having a series of projections with intervening recesses, the upper surfaces of which projections are inclined for a portion of their length, a series of ejectors, one of which is located within each of the recesses between the said projections of the die plate, means for yieldingly maintaining the said ejectors in their normal positions, a series of punches adapted to coöperate with the said projections and intervening recesses, a stripper plate provided with a series of recesses similar in number and size and adapted to register with the recesses between the projections of the die plate, the under surface of the said stripper plate being inclined at the same angle as the inclination of the upper surfaces of the said projections of the die plate, a knife for cutting the paper stock transversely thereof, and means for actuating the said knife and series of punches.

10. In a machine for making match cards from a strip of paper stock, and in combination, a die plate having a series of projections with intervening recesses, the upper surfaces of which projections are inclined for a portion of their length, a series of ejectors, one of which is located within each of the recesses between the said projections of the die plate, means for yieldingly maintaining the said ejectors in their normal positions, a series of punches adapted to coöperate with the said projections and intervening recesses, a stripper plate provided with a series of recesses similar in number and size and adapted to register with the recesses between the projections of the die plate, the under surface of the said stripper plate being inclined at the same angle as the inclination of the upper surfaces of the said projections of the die plate, a knife for cutting the paper stock transversely thereof, and a yieldingly mounted presser plate for securing the stock in position while being cut by the knife.

11. In a machine for making match cards having series of spaced match splints and shoulders at the ends of the individual card blanks, and in combination, a die plate having a series of die bars and intervening slots, a series of punches adapted to coöperate with the said die bars and slots to slit the stock from which the match card is made to provide for the said spaced match groups and shoulders at the ends of the cards, a stripper plate having series of slots therein, corresponding in number and size and adapted to register with the slots in the said die plate, and means for actuating the parts to cause the said punches to coöperate with the said stripper plate and the said series of bars and slots in the die plate.

12. In a machine for making match cards having series of spaced match splints and shoulders at the ends of the individual card blanks, and in combination, a die plate having a series of die bars and intervening slots, a series of punches adapted to coöperate with the said die bars and slots to slot the stock from which the match card is made to provide for the said spaced match groups and shoulders at the ends of the cards, a stripper plate having series of slots therein, corresponding in number and size and adapted to register with the slots in the said die plate, means for yieldingly mounting and limiting the movement of the stripper plate, and means for actuating the parts to cause the said punches to coöperate with the said stripper plate and the said series of bars and slots in the die plate.

13. In a machine for making match cards from a continuous strip of paper stock, which is fed pre-determined distances intermittently, and in combination, means for punching slots in the paper stock at one portion thereof to provide for spaced match groups, means for cutting the stock strip transversely thereof, and means for cutting match splints in the said spaced portions.

14. In a machine for making match cards from a continuous strip of paper stock, which is fed predetermined distances intermittently, and in combination, a die plate having a series of die bars and intervening slots therein, a series of punches adapted to coöperate with the said bars and intervening slots to punch slots in the paper stock in one part thereof to form spaced match splint portions, means for cutting the paper stock transversely thereof in another part to form a match card blank, and means for slitting the said spaced match splint portions to form match splints therein.

15. In a machine for making match cards from a continuous strip of paper stock, which is fed predetermined distances intermittently, and in combination, a die plate having a series of die bars and intervening slots therein, a series of punches adapted to coöperate with the said bars and intervening slots to punch slots in the paper stock in one part thereof to form spaced match splint portions, means for cutting the paper stock transversely thereof in another part to form a match card blank, means intermediate of the said die plate and punches for protecting the paper stock while the said punches are being withdrawn from the recesses between the bars in the die block, and means for slitting the said spaced match splint portions to form match splints therein.

16. In a machine for making match cards from a continuous strip of paper stock, which is fed predetermined distances intermittently, and in combination, a die plate having a series of die bars and intervening slots therein, a series of punches adapted to coöperate with the said bars and intervening slots to punch slots in the paper stock in one part thereof to form spaced match splint portions, means for cutting the paper stock transversely thereof in another part to form a match card blank, a stripper plate having a series of recesses corresponding in number and size and adapted to register with the slots between the bars of the die plate, and means for yieldingly mounting the said stripper plate and limiting the movement thereof.

17. In a machine for making match cards from a continuous strip of paper stock, which is fed predetermined distances intermittently, and in combination, means for punching a series of spaced slots in the paper stock to provide spaced match splint portions in one part thereof, means for cutting the card transversely to form match card blanks, a die plate having a series of projections and intervening recesses, a series of punches adapted to coöperate with the said projections and intervening recesses to form match splints in the said match splint portions.

18. In a machine for making match cards from a continuous strip of paper stock, which is fed predetermined distances intermittently, and in combination, means for punching a series of spaced slots in the paper stock to provide spaced match splint portions in one part thereof, means for cutting the card transversely to form match card blanks, a die plate having a series of projections and intervening recesses, a series of punches adapted to coöperate with the said projections and intervening recesses to form match splints in the said match splint portions, and a series of ejectors, each of which is placed within one of the recesses between the projections of the die plate.

19. In a machine for making match cards from a continuous strip of paper stock, which is fed predetermined distances intermittently, and in combination, means for punching a series of spaced slots in the paper stock to provide spaced match splint portions in one part thereof, means for cutting the card transversely to form match card blanks, a die plate having a series of projections and intervening recesses, a series of punches adapted to coöperate with the said projections and intervening recesses to form match splints in the said match splint portions, and means coöperating with the said series of punches and projections with intervening recesses for maintaining the match splints in position while the said series of punches is being withdrawn from the spaces between the projections of the die plate.

20. In a machine for making match cards from a continuous strip of paper stock, which is fed predetermined distances intermittently, and in combination, means for punching a series of spaced slots in the paper stock to provide spaced match splint portions in one part thereof, means for cutting the card transversely to form match card blanks, a die plate having a series of projections and intervening recesses, a series of punches adapted to coöperate with the said projections and intervening recesses to form match splints in the said match splint portions, a series of ejectors, one each of which is placed within one of the recesses between the projections of the die plate, means for yieldingly maintaining the said ejectors in a normal position, and means intermediate of the said series of punches and projections of the die plate for maintaining the match splints in position, insuring the same against injury while the punches are being withdrawn from the recesses between the projections of the die plate.

21. In a machine for making match cards from a continuous strip of paper stock, which is fed predetermined distances intermittently, and in combination, means for punching a series of spaced slots in the paper stock to provide spaced match splint portions in one part thereof, means for cutting the card transversely to form match card blanks, a die plate having a series of projections and intervening recesses, a series of punches adapted to coöperate with the said projections and intervening recesses to form match splints in the said match splint portions, a series of ejectors, one each of which is placed within one of the recesses between the projections of the die plate, a stripper plate having series of slots corresponding in size and number, and adapted to register with the recesses between the projections of the die plate, and means for yieldingly maintaining the said stripper plate in position, and limiting the movement thereof.

22. In a machine for making match cards from a continuous strip of paper stock, which is fed predetermined distances intermittently, and in combination, means for punching a series of spaced slots in the paper stock to provide spaced match splint portions in one part thereof, means for cutting the card transversely to form match card blanks, a die plate having a series of projections and intervening recesses open at one end, the upper portions of the said projections being inclined for a part of their length, a series of punches adapted to cooperate with the said projections and intervening recesses of the die plate, a stripper plate having series of slots corresponding in number and size, and adapted to register with the recesses intervening between the projections of the die plate, the under surface of the said strip of plate being inclined at an angle corresponding to the inclination of the inclined upper surfaces of the said projections, and means for yieldingly maintaining the said stripper plate in a normal position and limiting the movement thereof.

23. In a machine for making match cards from a continuous strip of paper stock, which is fed predetermined distances intermittently, and in combination, means for punching a series of spaced slots in the paper stock to provide spaced match splint portions in one part thereof, means for cutting the card transversely to form match card blanks, a die plate having a series of projections and intervening recesses opening at one end, the upper portions of the said projections being inclined for a part of their length, a series of ejectors, one of which is located in one of the said recesses between the projections of the die plate, and means for yieldingly maintaining the said ejectors in their normal positions.

24. In a machine for making match cards from a continuous strip of paper stock, which is fed predetermined distances intermittently, and in combination, means for punching series of slots in the stock strip at one part thereof to provide spaced match strip portions and notches in the edge of the card, when formed, means for severing the stock strip transversely along the line co-incident with the forward edges of certain of the said slots and co-incident with the rearward edges of certain of the other slots therein to provide spaced match splint portions and notches in the edges of the card blanks, and means for slitting the said match splint portions to form match splints therein.

25. In a machine for making match cards from a continuous strip of paper stock, which is fed predetermined distances intermittently, and in combination, a die plate having a series of bars and intervening slots therein, a series of punches adapted to coöperate with the said bars and intervening slots to provide in one part of the stock strip spaced match splint portions, a stripper plate intervening between the said die plate and series of punches, means for cutting the stock strip transversely on a line co-incident with the forward edges of the slots provided therein to form the said match splint portions, a second die plate having a series of projections thereon with intervening recesses, a second series of punches adapted to coöperate with the said projections and intervening recesses to form match splints in the match splint portions, and a stripper plate intermediate of the last aforesaid series of punches and projections and intermediate recesses with which the same coöperate.

26. In a machine for making match cards from a continuous strip of paper stock, which is fed predetermined distances intermittently, and in combination, a die plate having a series of bars and intervening slots therein, a series of punches adapted to coöperate with the said bars and intervening slots to provide in one part of the stock strip spaced match splint portions, a stripper plate intervening between the said die plate and series of punches, means for cutting the stock strip transversely on a line co-incident with the forward edges of the slots provided therein to form the said match splint portions, a second stripper plate having a series of projections and intervening open-ended recesses, the upper surfaces of the said projections being inclined rearwardly for a certain portion of their length, a series of punches adapted to coöperate with the said projections and intervening recesses to form match splints in the said match splint portions, and a stripper plate intermediate of the last aforesaid series of punches and projections and intermediate recesses with which the same coöperate, the under surface of the said stripper plate being inclined at the same angle as the upper inclined surfaces of the said projections.

27. In a machine for making match cards from a continuous strip of paper stock, which is fed predetermined distances intermittently, and in combination, means for punching the series of spaced slots in one part of the stock to provide for spaced match splint portions and shoulders at the ends of the individual match cards. means for cutting the edges of the said shoulders to make the match cards of uniform length, means for severing the paper stock transversely along a line co-incident with the forward edges of the said slots formed therein to provide the match card blank, and means for slitting the said match splint portions to provide the match splints therein.

28. In a machine for making match cards from a strip of paper stock, and in combination, a die plate having a series of projections and intervening open-ended recesses, the upper surfaces of the said projections being inclined for a portion of their length, a series of punches adapted to coöperate with the said projections and intervening recesses, the faces of the punches being placed in substantially horizontal positions, and a stripper plate intervening between the said projections and punches, the under surface of which is inclined at the same angle as the upper faces of the projections, and the rear edge of which is tapered so that in the coöperation of the parts the stock from which the match cards are made is bent along a line at the base of the match splints, formed therein by the said projections and intervening recesses, and the said punches coöperating therewith.

Signed by me this 19th day of March, 1913.

CESARE CAMPUS.

Witnesses:
 BERTHA M. ALLEN,
 J. B. LE BLANC.